US006580187B2

United States Patent
Bradfield

(10) Patent No.: US 6,580,187 B2
(45) Date of Patent: *Jun. 17, 2003

(54) RECTIFIER ASSEMBLY FOR AN AIR-COOLED GENERATOR

(75) Inventor: Michael Duane Bradfield, Anderson, IN (US)

(73) Assignee: Delphi Technologies, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/483,100

(22) Filed: Jan. 14, 2000

(65) Prior Publication Data

US 2002/0079757 A1 Jun. 27, 2002

(51) Int. Cl.$^7$ .......................... H02K 5/18; H02K 11/00; H02K 5/00
(52) U.S. Cl. .......................... 310/64; 310/68 D; 310/91
(58) Field of Search .............................. 310/64, 58, 52, 310/65, 68 R, 66, 85, 68 D, 91

(56) References Cited

U.S. PATENT DOCUMENTS

| | | | | | |
|---|---|---|---|---|---|
| 3,684,944 A | * | 8/1972 | Evgrafov et al. | ............ | 363/126 |
| 4,668,898 A | * | 5/1987 | Harms et al. | ................ | 318/254 |
| 4,841,182 A | * | 6/1989 | Tsuchiya et al. | ........... | 310/68 D |
| 5,258,673 A | * | 11/1993 | Gotoh | ....................... | 310/68 D |
| 5,640,062 A | * | 6/1997 | Yockey | ..................... | 310/68 D |
| 5,646,838 A | * | 7/1997 | Keidar et al. | .............. | 310/68 D |
| 5,712,517 A | * | 1/1998 | Schmidt et al. | ................ | 310/45 |
| 5,932,942 A | * | 8/1999 | Patyk et al. | ................... | 310/58 |
| 5,998,893 A | * | 12/1999 | Fowler et al. | ............. | 310/68 R |

FOREIGN PATENT DOCUMENTS

| | | | | | |
|---|---|---|---|---|---|
| DE | 3835454 A1 | * | 8/1989 | ........... | H02K/11/00 |
| EP | 262907 A1 | * | 4/1988 | ........... | H02K/11/00 |

OTHER PUBLICATIONS

Bradfield, "An Output Stud Assembly for a Bridge Rectifier and a Method of Manufacturing the Output Stud Assembly", Attorney Docket No. H–205355 filed in the U.S. Patent Office concurrently with this file.

* cited by examiner

Primary Examiner—Joseph Waks
Assistant Examiner—Guillermo Perez
(74) Attorney, Agent, or Firm—Margaret A. Dobrowitsky

(57) ABSTRACT

A heat sink structure is provided for a rectifier assembly of an air-cooled generator. The heat sink structure comprises a substantially annular base having inner and outer edges. The inner and/or outer edges have (has) a cooling fin arrangement projecting out from the base. The heat sink structure is provided with diode mounts. Each diode mount is adapted to retain a respective diode in a thermally conductive (and preferably press-fit) manner. Heat from each diode is transferred to the base and cooling fin arrangement, to provide a heat sink effect. Also provided is a method of manufacturing a heat sink structure. The method comprises the steps of configuring a sheet of thermally conductive material to include a substantially annular base and radial extensions of the base, and bending the radial extensions so that the radial extensions are substantially perpendicular to the annular base. Perpendicular extensions or prongs thus are defined. A rectifier assembly is provided. The rectifier assembly comprises a substantially annular support, heat sink, and insulator. The insulator is sandwiched between the support and the heat sink structure to electrically insulate the support from the heat sink structure. The support permits air to flow around at least a majority of radially inner edges of the support and the heat sink structure and also around at least a majority of radially outer edges of the support and the heat sink structure. This, in turn, facilitates the transfer of heat from the heat sink structure and the support to the air.

22 Claims, 4 Drawing Sheets

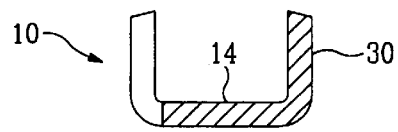
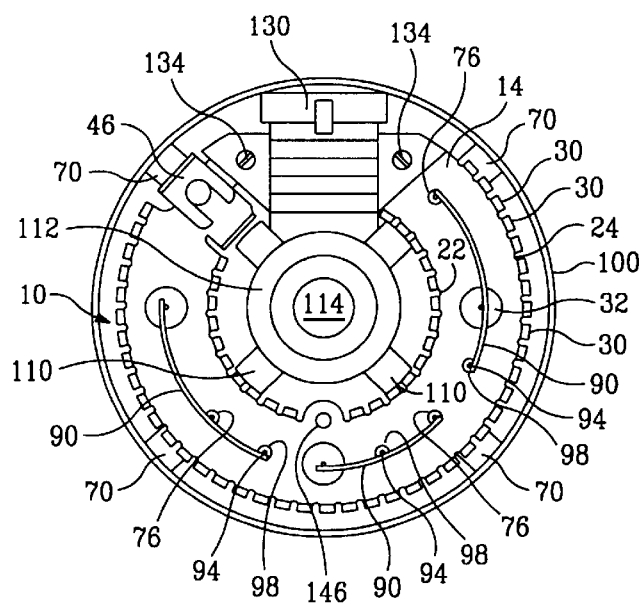
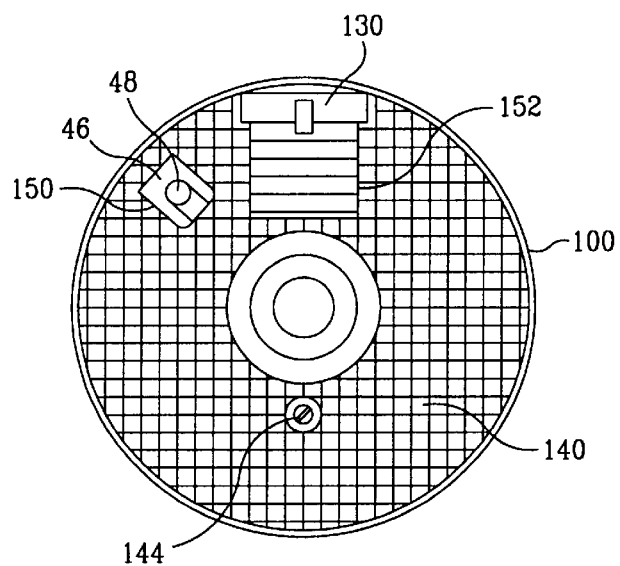

RECTIFIER ASSEMBLY FOR AN AIR-COOLED GENERATOR

BACKGROUND OF THE INVENTION

1. Field of the Invention

The present invention relates to a rectifier assembly for an air-cooled generator, a heat sink structure for use in such a rectifier assembly, and a method of producing a heat sink structure for a rectifier assembly.

2. Discussion of the Related Art

It is known that excessive heat accumulation can cause the rectifier of an automotive generator to malfunction. Efforts therefore have been directed to cooling such rectifiers. In some cases, the cooling is provided by air, while in other cases, the cooling is provided by significantly more expensive and complicated liquid cooling techniques (e.g., using a water coolant). The prior art techniques for cooling the rectifier of a generator typically provide inadequate cooling (e.g., the heat is not dissipated as fast as it is accumulated, especially in the case of air-cooled arrangements), are difficult to assemble, take too much time to assemble, require complex structures or expensive parts, leave the diodes of the rectifier susceptible to bridging as a result of salt or other forms of contamination, and/or fail to provide sufficiently robust isolation between the electrically positive and negative parts of the rectifier.

There is consequently a need in the art for a rectifier assembly for an air-cooled generator, a heat sink structure for use in such a rectifier assembly, and/or a method of producing a heat sink structure for a rectifier assembly, each of which provide(s) sufficient cooling of the rectifier diodes to prevent damage or malfunctioning of the rectifier diodes, is easy to assemble in a relatively short period of time, requires few, if any, complex structures or expensive parts, avoids bridging as a result of salt or other forms of contamination, and/or provides robust isolation between the electrically positive and negative parts of the rectifier.

SUMMARY OF THE INVENTION

It is a primary object of the present invention to overcome the foregoing problems and/or to satisfy at least one of the aforementioned needs by providing a rectifier assembly for an air-cooled generator, a heat sink structure for use in such a rectifier assembly, and/or a method of manufacturing a heat sink structure for a rectifier assembly, wherein the heat sink structure includes a substantially annular base plate with cooling fins projecting therefrom and/or wherein the heat sink structure is arranged so that air is permitted to flow around at least a majority of radially inner edges of the heat sink structure and also around at least a majority of radially outer edges of the heat sink structure, thereby facilitating transfer of heat from the heat sink structure to the air.

To achieve this and other objects and advantages, the present invention provides a heat sink structure for a rectifier assembly of an air-cooled generator. The heat sink structure comprises a substantially annular base having an inner edge and an outer edge. At least one of the inner edge and outer edge has a cooling fin arrangement projecting out from the base. The heat sink structure also is provided with diode mounts. Each of the diode mounts is adapted to retain a respective diode in a thermally conductive manner. Heat from each respective diode is transferred to the base and to the cooling fin arrangement, to provide a heat sink effect.

The present invention also provides a method of manufacturing a heat sink structure for a rectifier assembly. The method comprises the steps of configuring a sheet of thermally conductive material to include a substantially annular base and radial extensions of the base, and bending the radial extensions so that the radial extensions are substantially perpendicular to the annular base, thereby defining perpendicular extensions.

A rectifier assembly for an air-cooled generator is also provided by the present invention. The rectifier assembly comprises a substantially annular support, a substantially annular heat sink, and a substantially annular insulator. The substantially annular support is thermally and electrically conductive. It is adapted to hold negative-side diodes in such a way that 1) a ground terminal of each negative-side diode is electrically connected to the support, 2) a phase terminal of each negative-side diode remains electrically connectable to a respective one of several stator output phases from the generator, and 3) the negative-side diodes are thermally connected to the support so that heat from the negative-side diodes is transferred to the support, to provide a heat sink effect. The substantially annular heat sink structure is thermally and electrically conductive. The heat sink structure is adapted to hold positive-side diodes in such a way that 1) a positive terminal of each positive-side diode is electrically connected to the heat sink structure, 2) a phase terminal of each positive-side diode remains connectable to a respective phase output from a respective one of the stator output phases from the generator, and 3) the positive-side diodes are thermally connected to the heat sink structure so that heat from the positive-side diodes is transferred to the heat sink structure, to provide a heat sink effect. The substantially annular electrical insulator is sandwiched between the support and the heat sink structure to electrically insulate the support from the heat sink structure. The support has a spacer feature that permits air to flow around at least a majority of radially inner edges of the support and the heat sink structure and also around at least a majority of radially outer edges of the support and the heat sink structure. This, in turn, facilitates the transfer of heat from the heat sink structure and the support to the air.

The expression "substantially annular", as used in this disclosure, encompasses not only purely annular structures (i.e., O-shaped structures), but also C-shaped structures and other structures that approximate a purely annular shape.

Still other objects, advantages, and features of the present invention will become more readily apparent when reference is made to the accompanying drawing and the associated description contained herein.

BRIEF DESCRIPTION OF THE DRAWINGS

FIG. 4 is a cross-sectional view of the heat sink structure shown in FIGS. 1–3 taken along line IV—IV in FIG. 3.

FIG. 5 is a front view of the rectifier assembly when the parts thereof are assembled together, according to the preferred embodiment shown in FIGS. 1–4

FIG. 6 is a front view of the rectifier assembly after a honeycombed cover thereof has been applied, according to the preferred embodiment shown in FIGS. 1–5.

DESCRIPTION OF PREFERRED EMBODIMENTS

Figure 1:
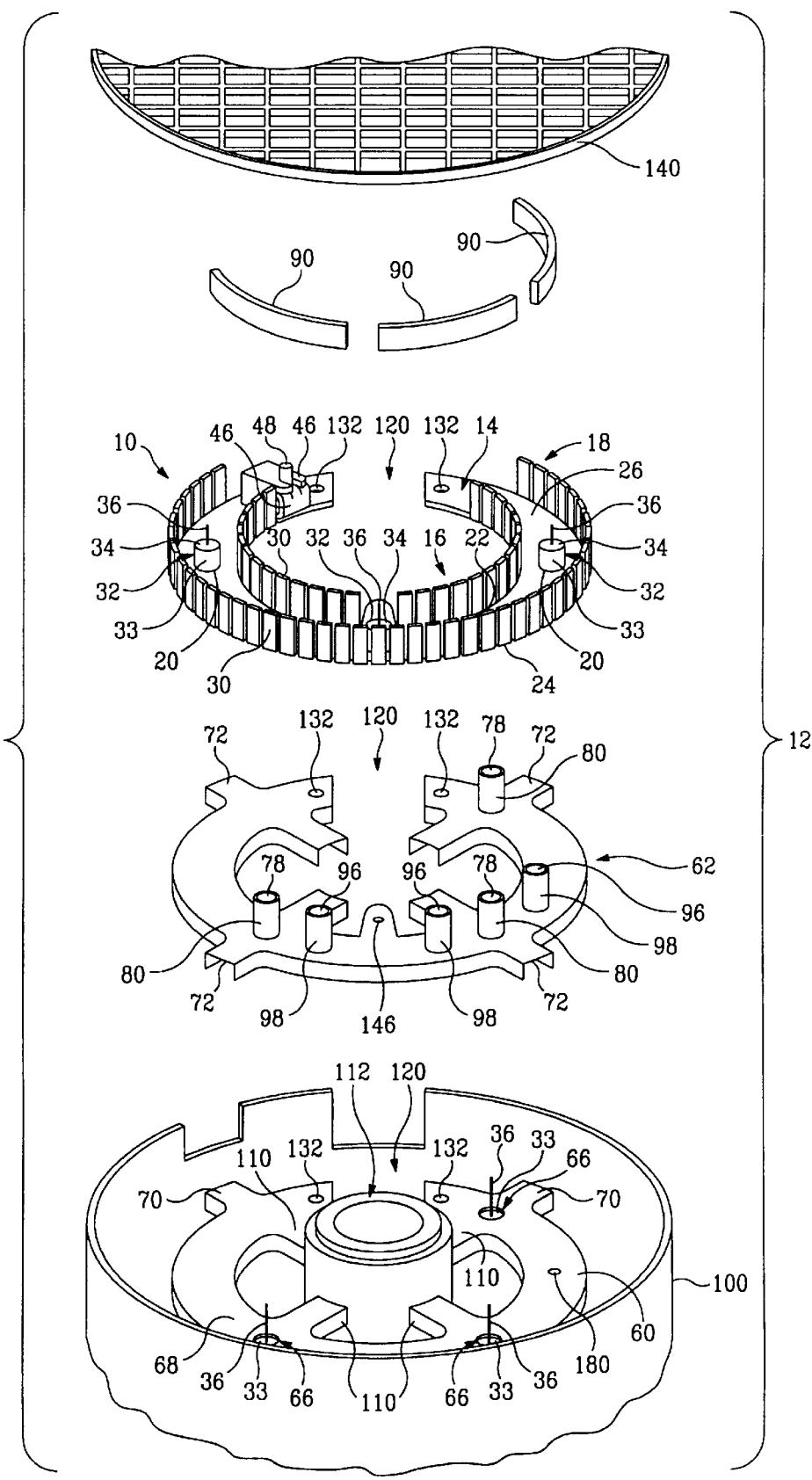
FIG. 1 is an exploded view of a rectifier assembly and a heat sink structure thereof, according to a preferred embodiment of the present invention.

FIG. 1 illustrates, among other things, a heat sink structure 10 according to a preferred embodiment of the present invention. As will be described hereinafter, the heat sink structure 10 is particularly well-suited for use as part of a rectifier assembly 12 of an air-cooled generator. The heat sink structure 10, however, can be used in other applications where similar benefits can be realized.

The exemplary heat sink structure 10 includes a substantially annular base 14, one or more cooling fin arrangements 16,18, and a plurality of diode mounts 20. The substantially annular base 14 has an inner edge 22 and an outer edge 24. Preferably, a cooling fin arrangement 16,18 is located at both the inner edge 22 and the outer edge 24 of the base 14. This tends to increase the surface area of the heat sink structure 10 that is exposed to air, and thereby enhances the desired heat sink or cooling effect. It is understood, however, that despite the benefits of having a cooling fin arrangement 16,18 projecting out from the base 14 at each of the edges 22,24 of the base 14, a single cooling fin arrangement 16 or 18 can be located on only one of the edges 22 or 24, or elsewhere on the base 14. Preferably, each cooling fin arrangement 16,18 extends substantially perpendicular to major surfaces 26,28 (only one of which (26) is visible in FIG. 1) of the base 14.

While each cooling fin arrangement 16,18 can be solid, it is preferable to enhance the heat sink effect by avoiding the use of a solid fin. In this regard, each of the cooling fin arrangements 16,18 preferably is defined by a plurality of prongs 30 that are spaced apart from one another around the base 14. The plurality of prongs 14 preferably are integral with the base 14 and extend substantially perpendicular to the major surfaces 26,28 of the base 14. As will be described hereinafter, certain manufacturing expedients can be achieved by making the heat sink structure 10 from a flat sheet of thermally and electrically conductive material. The prongs 30, in this regard, can be made to extend substantially perpendicular to the major surfaces 26,28 of the base 14 by bending radial extensions of the base 14 toward a perpendicular orientation.

Each of the diode mounts 20 is adapted to retain a respective diode 32 in a thermally conductive manner. Heat from each respective diode 32 is transferred to the base 14 and to the cooling fin arrangement(s) 16,18, to provide the desired heat sink effect. Preferably, press-fit diodes 32 are used. Such diodes 32 are generally known. Typically, they have a conductive housing 33 with a closed end (not visible in FIG. 1) and an open end 34. The closed end, during installation of the diode 32, is press-fit into a correspondingly sized recess 20. The correspondingly sized recesses 20, in this regard, constitute the diode mounts 20. The diode material is contained within the conductive housing 33. The conductive housing 33 serves as either the anode or the cathode of the diode 32. Projecting out from the diode 32, through the open end 34 of the conductive housing 33, is an electrical diode terminal 36 that defines the opposite terminal to the conductive housing 33. This electrical diode terminal 36 defines the cathode if the conductive housing 33 serves as the anode, or defines the anode if the conductive housing 33 serves as the cathode. The diode terminal 36 that projects out from the open end 34 of the conductive housing 33 does not make electrical contact with the conductive housing 33.

One type of press-fit diode 232 (hereinafter "TYPE NEG") allows current to flow into the conductive housing 33, through the diode 232, and out through the diode terminal 36 that extends through the open end 34 of the conductive housing 33. Current, however, cannot pass in the reverse direction. Another type of press-fit diode 32 (hereinafter "TYPE POS") allows the current to flow into the diode terminal 36 that projects out from the open end 34 of the conductive housing 33, through the diode 32, and out from the conductive housing 33. Electrical current cannot flow in the reverse direction.

For the exemplary arrangement shown in FIG. 1, the heat sink structure 10, as will be described hereinafter, is provided on the positive side rather than the electrical ground side of the rectifier assembly 12. Accordingly, it carries the positive-type ("TYPE POS) of diodes 32.

As the flow of electrical current heats the press-fit diodes 32, the press-fit diodes 32 transfer this heat to their surroundings. Preferably, the diode mounts 20 of the heat sink structure 10 are defined by a circumferential wall of a recess 20 or hole in the base 14 of the heat sink structure 10. The heat from each diode 32 therefore is transferred to the heat sink structure 10. This heat, in turn, is readily transferred to air flowing about the heat sink structure 10. This transfer of heat is enhanced by the increased surface area provided by the prongs 30.

Figure 2:
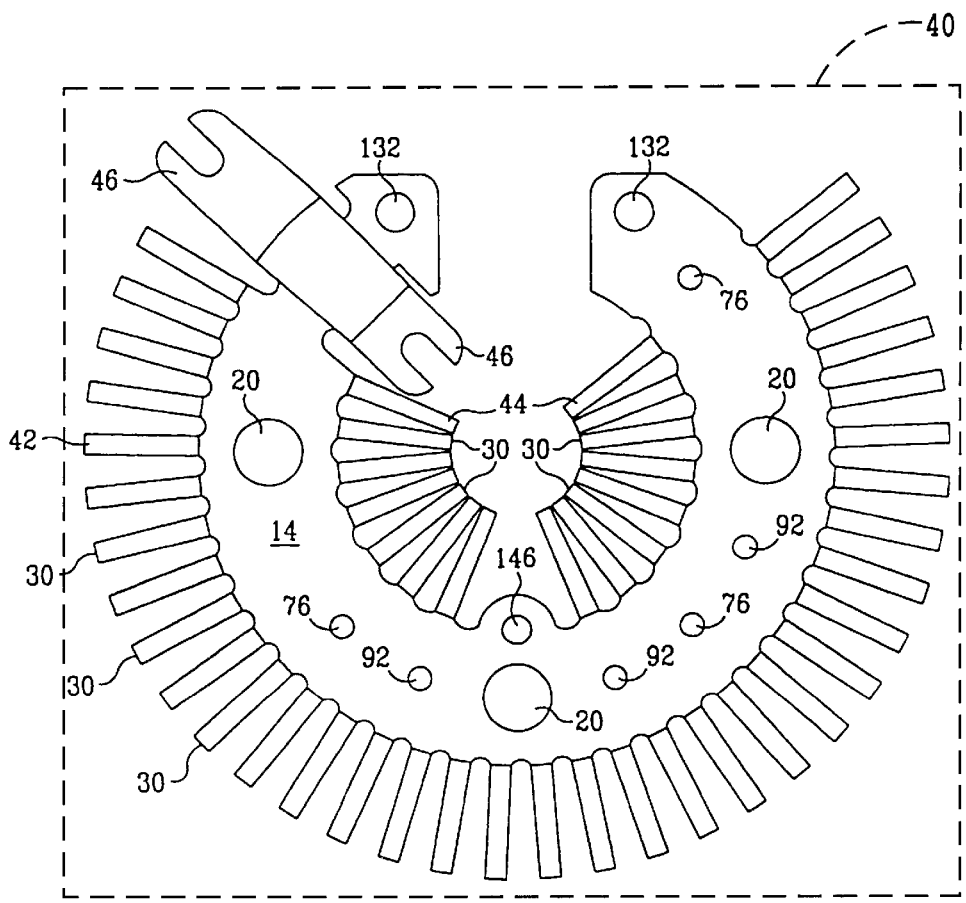
FIG. 2 is a top view of a sheet of material that is configured to provide a heat sink structure, according to a preferred implementation of the present invention.
Figure 3:
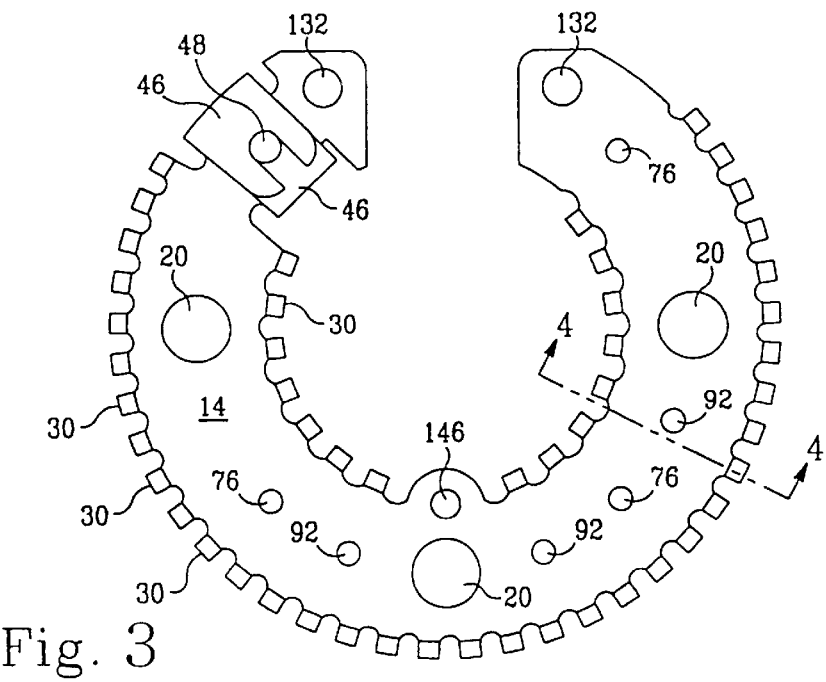
FIG. 3 is a top view of the sheet of material shown in FIG. 2, after bending, according to a preferred embodiment of the present invention.

With reference to FIGS. 2–4, the heat sink structure 10 advantageously can be manufactured in a relatively uncomplicated and inexpensive manner from a sheet 40 of electrically and thermally conductive material. The sheet 40 preferably is made of aluminum that is preferably about 4 to 5 millimeters thick.

A preferred method of manufacturing the heat sink structure 10 for a rectifier assembly 12, includes the steps of configuring the sheet 40 of thermally conductive material to include a substantially annular base 14 and radial extensions 42,44 of the base 14, and then bending the radial extensions 42,44 so that the radial extensions 42,44 are substantially perpendicular to the annular base 14, thereby defining perpendicular extensions. Such perpendicular extensions define the aforementioned prongs 30.

As shown in FIG. 2, the step of configuring preferably includes stamping the sheet 40 of thermally conductive material and removing a stamped away portion 46 of the thermally conductive material so that the substantially annular base 14 and the radial extensions 42,44 remain. In FIG. 2, the sheet 40 is designated using broken lines. The structure 14,42,44 that remains after stamping is shown in solid lines.

Where it is desirable to provide prongs 30 on both the radially inner edge 22 of the base 14 and the radially outer edge 24 of the base 14, the step of configuring the sheet 40 of thermally conductive material preferably is performed, as shown in FIG. 2, so that some of the radial extensions 42 extend radially out from the substantially annular base 14 and others of the radial extensions 44 extend radially in from the substantially annular base 14. Preferably, the step of bending then is performed on the radial extensions 42 that extend radially out from the substantially annular base 14 and also on the radial extensions 44 that extend radially in from the substantially annular base 14.

As illustrated in FIGS. 3 and 4, such bending preferably continues until the heat sink structure 10 is provided with a substantially U-shaped cross-section. The substantially U-shaped cross-section is defined by the base 14 and the perpendicular extensions that result from bending of the radial extensions 42,44. The heat sink structure 10, in this manner, can be provided with the perpendicular prongs 30 on both the radially inner and radially outer edges 22,24 of the base 14.

While it is desirable to practice the manufacturing method of the present invention so that the perpendicular prongs 30 are provided on both the radially inner and radially outer edges 22,24 of the base 14, it will be appreciated that the invention is so limited. To the contrary, the configuring step and bending step can be performed so that prongs 30 are provided on only one of the radially inner and radially outer edges 22,24 of the base 14.

While stamping is the preferred way of configuring the sheet 20, it is understood that alternative techniques, such as cutting, can be used. An advantage of the stamping process is that, in a single stamping operation, the base 14 can be provided with not only the extensions that eventually define the prongs 30, but also with diode mounts 20 (e.g., in the form of recesses or holes) and/or additional holes and features (to be described hereinafter) that are used to accommodate other features of the heat sink structure 10 or of the rectifier assembly 12 in which the heat sink structure 10 is used. One such feature is a bolt retention feature 46 that, as shown in FIG. 3, can be wrapped around the head of a conventional bolt 48 to define a battery voltage connection or post (i.e., a B-post) of the rectifier assembly 12.

When the bolt retention feature 46 is implemented integrally with the positive heat sink structure 10, both preferably are made using a grade 3003-O aluminum alloy. This particular alloy is preferred because, despite its reasonable cost, it can be bent 180 degrees over a zero radius (e.g., at gauges between 1/64 inch and 1/8 inch), it provides an advantageously low electrical resistance of about 13 micro-ohms, and provides favorable thermal conductivity. When this alloy forms the bolt retention feature 46, tests of the torque required to loosen a conventional bolt 48 (connected using an initial joint torque of 16 Newton-meters) from the anti-rotational effect provided by the wrap-around portion advantageously yielded a torque value as high as 11.7 Newton-meters during immediate loosening tests, and during thermocycle testing, yielded a torque value as high as 13.0 Newton-meters after 168 hours of cycling between −40 degrees Celsius and 165 degrees Celsius.

By comparison, testing of a conventional stud arrangement yielded a 70 micro-ohm resistance, and torque values of 13.2 Newton-meters in response to the immediate loosening test and 14.3 Newton-meters in response to the thermocyclic testing.

The ability to use a stamping process in the manner described above greatly simplifies the overall manufacturing process and represents a significant savings in cost over other ways of providing heat sink structures. It also represents a significant savings in the time required to manufacture each heat sink structure 10.

The diode mounts 20 and other features, of course, can be provided using alternative techniques (e.g., drilling, cutting, and the like). In this regard, they need not be made using the aforementioned stamping technique.

Figure 7:
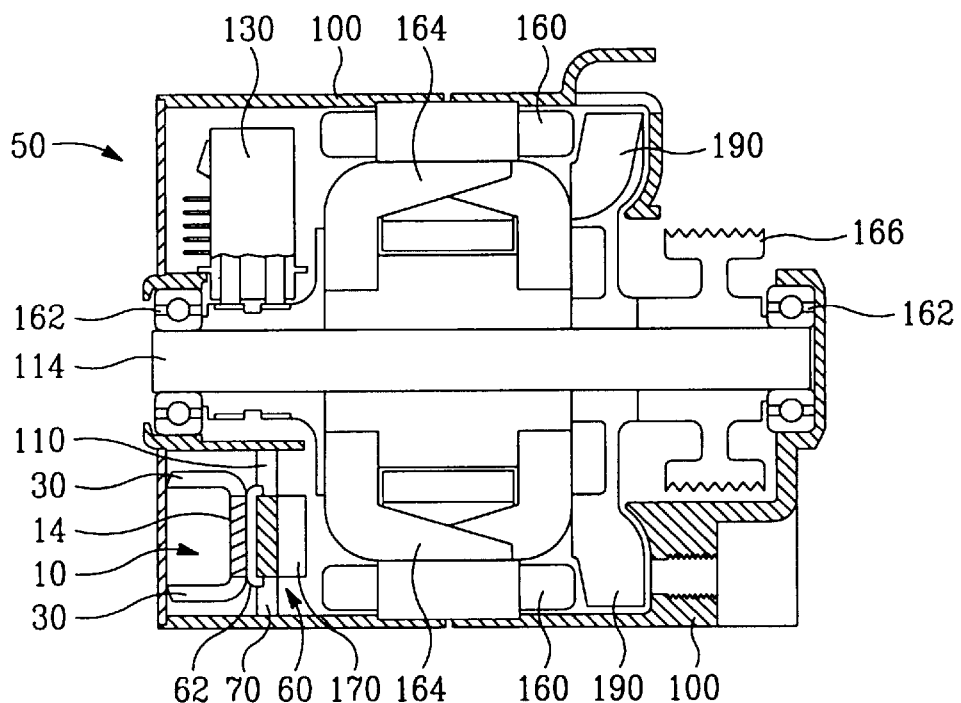
FIG. 7 is a cross-sectional view of an exemplary generator in which the rectifier assembly of FIGS. 1–6 has been mounted.

As illustrated in FIG. 1, the present invention also provides the rectifier assembly 12 that includes the aforementioned heat sink structure 10. The exemplary rectifier assembly 12 is adapted for use in an air-cooled generator. An exemplary generator 50 is shown in FIG. 7 and will be described hereinafter. It is understood, however, that the exemplary rectifier assembly 12 can be applied to other uses.

The exemplary rectifier assembly 12 is adapted for use with a three-phase generator of the type commonly associated with automotive engines. It therefore is adapted to hold three negative-side diodes 232 (TYPE NEG) and three positive-side diodes 32 (TYPE POS). Each stator phase of the generator 50 is associated with one of the positive-side diodes 32 (TYPE POS) and one of the negative-side diodes 232 (TYPE NEG). More specifically, each negative-side diode 232 (TYPE NEG) is electrically connected between the generator's electrical ground (e.g., its housing) and a respective stator phase winding so that electrical current can flow from the electrical ground into the respective stator phase winding, but not in the reverse direction. Each positive-side diode 32 (TYPE POS), by contrast, is connected between the rectifier's output terminal (i.e., the terminal that typically is connected to a positive terminal of the battery or other device to be charged) and a respective stator phase winding so that electrical current can flow from the respective stator phase winding to the rectifier's output terminal, but not in the reverse direction. In FIGS. 1, 3 and 5, the bolt 48 defines the rectifier's output terminal.

The exemplary rectifier assembly 12 includes a substantially annular support 60, a substantially annular heat sink structure 10 (of the type described above), and a substantially annular insulator 62 sandwiched between the heat sink structure 10 and the annular support 60.

The annular support 60 is thermally and electrically conductive, and is adapted to hold negative-side diodes 232 (TYPE NEG) in such a way that 1) a ground terminal of each negative-side diode 32 (i.e., the conductive housing 33 thereof) is electrically connected to the support 60, 2) a phase terminal (i.e., terminal 36) of each negative-side diode 232 (TYPE NEG) remains electrically connectable to a respective one of several stator output phases from the generator 50, and 3) the negative-side diodes 232 (TYPE NEG) are thermally connected to the support 60 so that heat from the negative-side diodes 232 (TYPE NEG) is transferred to the support 60, to provide a heat sink effect.

The annular support 60 preferably includes three negative-side recesses 66 on a first major surface 68 of the support 60. Each of the negative-side recesses 66 is adapted to receive a press-fit version of the negative-side diodes 232 (TYPE NEG) in such a way that walls of the negative-side recesses 66 press-fittingly retain the negative-side diodes 232 (TYPE NEG).

The substantially annular heat sink structure 10 also is thermally and electrically conductive. The annular heat sink structure 10 preferably is of the type described above. The heat sink structure 10 is adapted to hold positive-side diodes 32 (TYPE POS) in such a way that 1) a positive terminal (i.e., the conductive housing 33) of each positive-side diode 32 (TYPE POS) is electrically connected to the heat sink structure 10, 2) a phase terminal (i.e., terminal 36) of each positive-side diode 32 (TYPE POS) remains connectable to a respective phase output from a respective one of the stator output phases from the generator 50, and 3) the positive-side diodes 32 (TYPE POS) are thermally connected to the heat sink structure 10 so that heat from the positive-side diodes 32 (TYPE POS) is transferred to the heat sink structure 10, to provide a heat sink effect.

The heat sink structure 10, as indicated above, preferably includes a plurality of positive-side recesses 20 on a first major surface 26 of the heat sink structure 10. Each positive-side recess 20 is adapted to receive a press-fit version of the positive-side diodes 32 (TYPE POS) in such a way that walls of the positive-side recesses 20 press-fittingly retain the positive-side diodes 32 (TYPE POS).

The substantially annular electrical insulator 62 is sandwiched between the support 60 and the heat sink structure 10 to electrically insulate the support 60 from the heat sink structure 10. The insulator 62 preferably has a U-shaped cross-section adapted to receive the support 60 so that the insulator 62 can be securely nested on the support 60.

The support 60 preferably has a spacer feature 70 that permits air to flow around at least a majority of radially inner edges of the support 60 and the heat sink structure 10 and also around at least a majority of radially outer edges of the support 60 and the heat sink structure 10. This, in turn, facilitates transfer of heat from the heat sink structure 10 and the support 60 to the air. The exemplary spacer feature 70 comprises four outwardly extending lugs 70. The insulator 62 preferably includes suitably shaped lug extensions 72 adapted to at least partially cover the lugs 70.

Preferably, the first major surface 26 of the heat sink structure 10 faces away from the insulator 62, and the heat sink structure 10 includes passage holes 76 through which the phase terminals (i.e., terminals 36) of the negative-side diodes 232 (TYPE NEG) can pass. The first major surface of the support 60 bears against the insulator 62. The insulator 62 preferably also has holes 78. These holes 78 in the insulator 62 are adapted to receive the phase terminals (i.e., terminals 36) of the negative-side diodes 232 (TYPE NEG) so that phase terminals (i.e., terminals 36) of the negative-side diodes 232 (TYPE NEG) extend through the insulator 62.

Preferably, the rectifier assembly 12 further includes phase terminal tunnels 80 that are made of electrically insulative material and that are positioned to receive respective ones of the phase terminals (i.e., terminals 36) of the negative-side diodes 232 (TYPE NEG). The phase terminal tunnels 80 electrically insulate respective ones of the phase terminals (i.e., terminals 36) of the negative-side diodes 232 (TYPE NEG) from the heat sink structure 10 as the phase terminals (i.e., terminals 36) of the negative-side diodes 232 (TYPE NEG) pass through the passage holes 76 of the heat sink structure 10 and extend beyond the first major surface 26 of the heat sink structure 10.

By providing the foregoing structure, the exemplary rectifier assembly 12 facilitates use of a convenient, inexpensive, and reliable technique for electrically connecting each negative-side diode 232 (TYPE NEG) to a respective positive-side diode 32 (TYPE POS) associated with the same stator phase. In particular, when the parts of the exemplary rectifier assembly 12 are brought together, with the diodes 32 in their respective recesses 20 or 66 and with the phase terminals (i.e., terminals 36) of the negative-side diodes 232 (TYPE NEG) extending through their respective phase terminal tunnels 80, an electrically conductive ribbon 90 for each stator phase can be used to electrically connect a phase terminal (i.e., terminal 36) of one of the negative-side diodes 232 (TYPE NEG) to a respective phase terminal (i.e., terminal 36) of one of the positive-side diodes 32 (TYPE POS). In making each such connection, each ribbon 90 is kept spaced apart from the first major side 26 of the heat sink structure 10 to keep it from making electrical contact with the first major side 26 of the heat sink structure 10.

The foregoing structure of the exemplary rectifier assembly 12 also advantageously facilitates use of a similarly convenient, inexpensive, and reliable technique for electrically connecting each pair of a negative-side diode 232 (TYPE NEG) and positive-side diode 32 (TYPE POS) to the stator phase connection associated with that pair. In particular, the heat sink structure 10 can include phase passage holes 92 (shown in FIGS. 2 and 3) through which phase connections 94 (shown in FIG. 5) to respective stator output phases from the generator 50 can pass. The insulator 62 also can have phase holes 96. The phase holes 96 are adapted to receive the phase connections 94 so that the phase connections 94 extend through the insulator 62. Phase connection tunnels 98 can be provided that are made of electrically insulative material and that are positioned to receive respective ones of the phase connections 94. The phase connection tunnels 98 electrically insulate the phase connections 94 from the heat sink structure 10 as the phase connections 94 pass through the phase passage holes 92 of the heat sink structure 10 and extend beyond the first major surface 26 of the heat sink structure 10. Preferably, each electrically conductive ribbon 90 that is used to electrically connect respective pairs of positive-side diodes 32 (TYPE POS) and negative-side diodes 232 (TYPE NEG) is also used to electrically connect a phase terminal (i.e., terminal 36) of one of the negative-side diodes 232 (TYPE NEG) and a respective phase terminal (i.e., terminal 36) of one of the positive-side diodes 32 (TYPE POS), to a respective one of the stator phase connections 94. This electrical connection using the conductive ribbon 90 preferably is accomplished by providing a ribbon 90 of suitable length and is performed while keeping the conductive ribbon 90 spaced apart from the first major side 26 of the heat sink structure 10.

Preferably, as shown in FIG. 1, the recesses 20,66 that receive the diodes are located well apart from one another to increase the efficiency of the heat sink effect provided by both the heat sink structure 10 and the support 66.

In addition, as shown in FIG. 1, it is desirable to form the support 60 integrally with the spacer feature 70 that permits air to flow around at least a majority of radially inner edges of the support 60 and of the heat sink structure 10 and also around at least a majority of radially outer edges of the support 60 and of the heat sink structure 10. Preferably, the spacer feature 70 is formed integrally with the support 60 and a substantially cylindrical generator housing 100.

For additional structural integrity and in order to enhance the heat sink effect of the support 60, the support 60 also can be provided with radially inner spacer features 110 that connect the support 60 to a hub 112. The rotor shaft 114 (shown in FIG. 7) of a generator 50 associated with the rectifier assembly 12 can be rotatably mounted within the hub 112.

FIG. 5 is a view of the rectifier assembly 12 when the parts thereof are assembled together. Notably, the substantially annular shape of the support 60 and of the heat sink structure 10 need not be complete. A gap (shown in FIG. 1) 120 in the shape can be provided to accommodate, for example, a voltage regulator 130 (shown in FIG. 5) associated with the generator 50. The support 60, insulator 62, and/or heat sink structure 10 can be provided with fastener holes 132 (shown in FIG. 1) that are used to mount the voltage regulator 130 to the rectifier assembly 12 using suitable fasteners 134 (shown in FIG. 5).

As shown in FIG. 6, a honeycombed cover 140 can be provided over the rectifier assembly 12 (e.g., over the first major surface 26 of the heat sink structure 10) to protect the rectifier assembly 12, while allowing air to flow through the rectifier assembly 12. The honeycombed cover 140, for example, can be made of plastic using conventional injection molding techniques. The honeycombed cover 140 preferably is substantially annular and can be secured in place using a suitable fastener 144 that is received in a fastener hole 146 in the heat sink structure 10, insulator 62, and/or support 60.

A positive output terminal (e.g., bolt 48) of the generator 50 is accessible through an opening 150 in the honeycombed cover 140. The positive output terminal (e.g., bolt 48) is electrically connected to the heat sink structure 10. The connection to the battery or other device to be charged by the generator 50 can be made via this positive output terminal (e.g., bolt 48). The honeycombed cover 140 also can include an opening 152 for part of the voltage regulator 130.

The substantially annular shape of the exemplary rectifier assembly 12 advantageously corresponds with the typical shape of a generator housing. It also advantageously provides an internal opening to accommodate the rotor shaft 114 of a typical generator 50.

With reference to FIG. 7, it can be seen how conveniently the rectifier assembly 12 fits within a generator housing 100 and around the rotor shaft 114 of the generator 50. In FIG. 5, the exemplary generator 50 includes the generator housing 100, stator windings 160 mounted to the housing 100, a pair of bearings 162, a rotor shaft 114 rotatably mounted to the bearings 162, rotor windings 164 carried by the rotor shaft 114, and a pulley 166 connected to the rotor shaft 114 and adapted to be turned by an engine belt (not shown).

The support 60 and generator housing 100 preferably are formed integrally as an aluminum die cast. The insulator 62 preferably is made of plastic. The heat sink structure 10 preferably is a stamped and formed aluminum plate that is provided using the manufacturing method described above. Other materials and manufacturing techniques, of course, can be used in lieu of, or in addition to, the foregoing exemplary materials and techniques.

Figure 8:
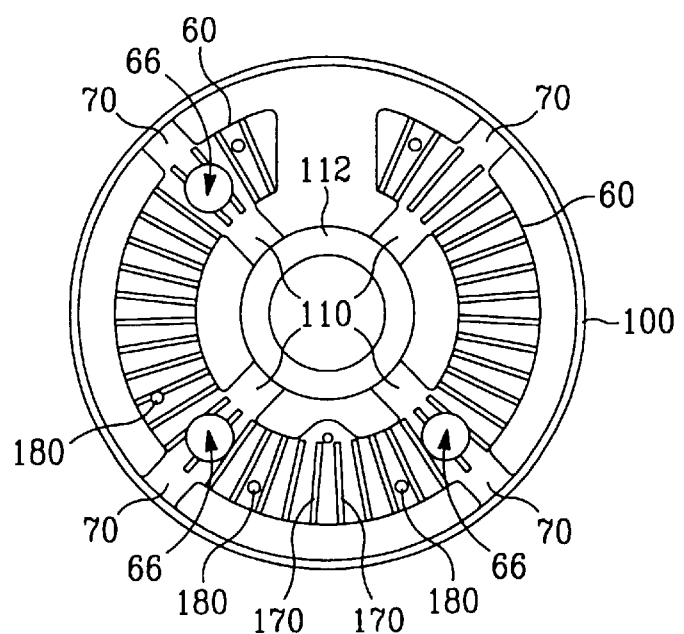
FIG. 8 is a rear view of a support of the rectifier assembly, showing heat dissipation fins that can be provided on the rear surface of the support.

Preferably, as shown in FIGS. 7 and 8, the heat sink effect of the support 60 is further enhanced by providing heat dissipation fins 170 on the major surface of the support 60 that faces away from the insulator 62. The support 60 also has stator phase passage holes 180 through which respective stator phase connections 94 can pass when being connected, through the stator phase connection tunnels 98, to their respective conductive ribbons 90.

Since the rectifier assembly 12 and the heat sink structure 10 thereof, occupy a significant amount of the usable space around the rotor shaft 114 and since they fill that space with a large surface area, the heat from the diodes 32 is dissipated in a very efficient manner. To further enhance this efficiency, the rotor (defined by the shaft 114 and the rotor windings 164) of the generator 50 can be provided with fan blades 190 that propel air through the spaces separating the heat sink structure 10 and the support 60 from the housing 100 and the hub 112. The fan blades 190 also propel air through the prongs 30 and fins 170. An efficient and compact heat sink structure therefore is provided.

The foregoing exemplary rectifier assembly 12 advantageously uses relatively inexpensive and uncomplicated parts, is provided using relatively inexpensive and uncomplicated manufacturing and assembling techniques, and despite these expedients, provides a very effective cooling action in conjunction with air flowing over and through the rectifier assembly 12.

While the exemplary rectifier assembly 12 is adapted to hold three negative-side diodes 232 (TYPE NEG) and three positive-side diodes (TYPE POS) so that it can be readily used with a three-phase generator (e.g., generator 50), it is understood that the invention is not limited to such an arrangement. The rectifier assembly 12 can be modified to hold more or fewer negative-side diodes 232 (TYPE NEG) and/or positive-side diodes 32 (TYPE POS), depending upon the intended application of the rectifier assembly 12.

While the present invention has been described with reference to certain preferred embodiments and implementations, it is understood that various modifications and variations will no doubt occur to those skilled in the art to which this invention pertains. These and all other such variations which basically rely of the teachings through which this disclosure has advanced the art are properly considered within the scope of this invention.

What is claimed is:

1. A rectifier assembly for an air-cooled generator, said rectifier assembly comprising:
   a substantially annular support that is thermally and electrically conductive, said support being adapted to fit within a generator housing having an inside diameter and to hold negative-side diodes in such a way that:
   a ground terminal of each negative-side diode is electrically connected to said support,
   a phase terminal of each negative-side diode remains electrically connectable to a respective one of several stator output phases from the generator, and
   the negative-side diodes are thermally connected to the support so that heat from said negative-side diodes is transferred to the support, to provide a heat sink effect; and
   a substantially annular heat sink structure that is thermally and electrically conductive, said heat sink structure being adapted to hold positive-side diodes in such a way that:
   a positive terminal of each positive-side diode is electrically connected to said heat sink structure,
   a phase terminal of each positive-side diode remains connectable to a respective phase output from a respective one of the stator output phases from the generator, and
   the positive-side diodes are thermally connected to the heat sink structure so that heat from said positive-side diodes is transferred to the heat sink structure, to provide a heat sink effect; and
   a substantially annular electrical insulator sandwiched between said support and said heat sink structure to electrically insulate the support from the heat sink structure, said support having a plurality of spacer features each radially extending from a major surface of said support to substantially said inside diameter and radially extending from a major surface of said support to said generator housing that permits air to flow around at least a majority of radially inner edges of said support and said heat sink structure and also around at least a majority of radially outer edges of said support and said heat sink structure, thereby facilitating transfer of heat from the heat sink structure and the support to the air.

2. The rectifier assembly of claim 1, wherein said support includes a plurality of negative-side recesses on said first major surface of said support, each of said negative-side recesses being adapted to receive a press-fit version of said negative-side diodes in such a way that walls of said negative-side recesses press-fittingly retain said negative-side diodes; and
   wherein said heat sink structure includes a plurality of positive-side recesses on a first major surface of said heat sink structure, each of said positive-side recesses being adapted to receive a press-fit version of said positive-side diodes in such a way that walls of said positive-side recesses press-fittingly retain said positive-side diodes.

3. The rectifier assembly of claim 2, wherein:

said first major surface of the heat sink structure faces away from said insulator;

said heat sink structure includes passage holes through which the phase terminals of the negative-side diodes can pass;

said first major surface of the support bears against said insulator;

said insulator has holes adapted to receive the phase terminals of the negative-side diodes so that phase terminals of the negative-side diodes extend through the insulator; and said rectifier assembly further includes phase terminal tunnels that are made of electrically insulative material and that are positioned to receive respective ones of the phase terminals of the negative-side diodes and electrically insulate said respective ones of the phase terminals of the negative-side diodes from the heat sink structure as said phase terminals of the negative-side diodes pass through the passage holes of the heat sink structure and extend beyond the first major surface of the heat sink structure.

4. The rectifier assembly of claim 3, further comprising an electrically conductive ribbon for each generator phase, each ribbon being adapted to electrically connect a phase terminal of one of the negative-side diodes to a respective phase terminal of one of the positive-side diodes, while remaining spaced apart from the first major side of the heat sink structure.

5. The rectifier assembly of claim 3, wherein:

said heat sink structure includes phase passage holes through which phase connections to respective stator output phases from the generator can pass;

said insulator has phase holes adapted to receive said phase connections so that said phase connections extend through the insulator; and said rectifier assembly further includes phase connection tunnels that are made of electrically insulative material and that are positioned to receive respective ones of the phase connections and electrically insulate said phase connections from the heat sink structure as said phase connections pass through the phase passage holes of the heat sink structure and extend beyond the first major surface of the heat sink structure.

6. The rectifier assembly of claim 5, further comprising an electrically conductive ribbon for each generator phase, each ribbon being adapted to electrically connect a phase terminal of one of the negative-side diodes and a respective phase terminal of one of the positive-side diodes, to a respective one of the phase connections, while remaining spaced apart from the first major side of the heat sink structure.

7. The rectifier assembly of claim 1, wherein said heat sink structure comprises:

a substantially annular base having an inner base edge and an outer base edge;

at least one of said inner base edge and said outer base edge having a cooling fin arrangement projecting out from the base; and diode mounts, each of which is adapted to retain a respective diode in a thermally conductive manner, whereby heat from each respective diode is transferred to said base and to said cooling fin arrangement, to provide a heat sink effect.

8. The rectifier assembly of claim 7, wherein said cooling fin arrangement includes a radially inner cooling fin arrangement projecting out from the inner base edge, and a radially outer cooling fin arrangement projecting out from the outer base edge.

9. The rectifier assembly of claim 8, wherein each of said radially inner cooling fin arrangement and said radially outer cooling fin arrangement extends substantially perpendicular to major surfaces of the base.

10. The rectifier assembly of claim 8, wherein each of said radially inner cooling fin arrangement and said radially outer cooling fin arrangement is defined by a plurality of prongs that are spaced from one another around the base.

11. The rectifier assembly of claim 10, wherein said plurality of prongs are integral with said base and extend substantially perpendicular to major surfaces of the base.

12. The rectifier assembly of claim 11, wherein said plurality of prongs are made to extend substantially perpendicular to the major surfaces of the base by bending radial extensions of said base toward a perpendicular orientation.

13. The rectifier assembly of claim 7, wherein each of said diode mounts is defined by a circumferential wall of a recess or hole in said base.

14. The rectifier assembly of claim 1, wherein said support is formed integrally with a housing of the generator.

15. The rectifier assembly of claim 1, further comprising a honeycombed protective cover mounted over said first major surface of the heat sink structure.

16. The rectifier assembly of claim 1, wherein said support includes a plurality of negative-side recesses on a first major surface of said support, each of said negative-side recesses being adapted to receive a press-fit version of said negative-side diodes in such a way that walls of said negative-side recesses press-fittingly retain said negative-side diodes;

wherein said heat sink structure includes a plurality of positive-side recesses on a first major surface of said heat sink structure, each of said positive-side recesses being adapted to receive a press-fit version of said positive-side diodes in such a way that walls of said positive-side recesses press-fittingly retain said positive-side diodes;

wherein said first major surface of the heat sink structure faces away from said insulator;

wherein said heat sink structure includes passage holes through which the phase terminals of the negative-side diodes can pass;

wherein said first major surface of the support bears against said insulator;

wherein said insulator has holes adapted to receive the phase terminals of the negative-side diodes so that phase terminals of the negative-side diodes extend through the insulator;

wherein said rectifier assembly further includes phase terminal tunnels that are made of electrically insulative material and that are positioned to receive respective ones of the phase terminals of the negative-side diodes and electrically insulate said respective ones of the phase terminals of the negative-side diodes from the heat sink structure as said phase terminals of the negative-side diodes pass through the passage holes of the heat sink structure and extend beyond the first major surface of the heat sink structure;

wherein said heat sink structure includes phase passage holes through which phase connections to respective stator output phases from the generator can pass;

wherein said insulator has phase holes adapted to receive said phase connections so that said phase connections extend through the insulator; and wherein said rectifier assembly further includes:

phase connection tunnels that are made of electrically insulative material and that are positioned to receive respective ones of the phase connections and electrically insulate said phase connections from the heat sink structure as said phase connections pass through the phase passage holes of the heat sink structure and extend beyond the first major surface of the heat sink structure, and an electrically conductive ribbon for each generator phase, each ribbon being adapted to electrically connect a phase terminal of one of the negative-side diodes and a respective phase terminal of one of the positive-side diodes, to a respective one of the phase connections, while remaining spaced apart from the first major side of the heat sink structure.

17. The rectifier assembly of claim 16, wherein said heat sink structure comprises:

a substantially annular base having an inner base edge and an outer base edge;

at least one of said inner base edge and said outer base edge having a cooling fin arrangement projecting out from the base.

18. The rectifier assembly of claim 17, wherein said cooling fin arrangement includes a radially inner cooling fin arrangement projecting out from the inner base edge, and a radially outer cooling fin arrangement projecting out from the outer base edge.

19. The rectifier assembly of claim 18, wherein each of said radially inner cooling fin arrangement and said radially outer cooling fin arrangement extends substantially perpendicular to major surfaces of the base.

20. The rectifier assembly of claim 18, wherein each of said radially inner cooling fin arrangement and said radially outer cooling fin arrangement is defined by a plurality of prongs that are spaced from one another around the base.

21. The rectifier assembly of claim 20, wherein said plurality of prongs are integral with said base and extend substantially perpendicular to major surfaces of the base.

22. The rectifier assembly of claim 21, wherein said plurality of prongs are made to extend substantially perpendicular to the major surfaces of the base by bending radial extensions of said base toward a perpendicular orientation.

* * * * *